(12) United States Patent
Eriksson et al.

(10) Patent No.: US 11,902,115 B2
(45) Date of Patent: Feb. 13, 2024

(54) ESTIMATING QUALITY METRIC FOR LATENCY SENSITIVE TRAFFIC FLOWS IN COMMUNICATION NETWORKS

(71) Applicant: Telefonaktiebolaget LM Ericsson (publ), Stockholm (SE)

(72) Inventors: Göran Eriksson, Norrtälje (SE); Magnus Westerlund, Upplands Väsby (SE); Stefan Håkansson, Gothenburg (SE); Gunnar Heikkilä, Gammelstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/623,759

(22) PCT Filed: Apr. 30, 2020

(86) PCT No.: PCT/EP2020/062119
§ 371 (c)(1),
(2) Date: Dec. 29, 2021

(87) PCT Pub. No.: WO2021/001085
PCT Pub. Date: Jan. 7, 2021

(65) Prior Publication Data
US 2022/0255816 A1 Aug. 11, 2022

Related U.S. Application Data

(60) Provisional application No. 62/868,944, filed on Jun. 30, 2019.

(51) Int. Cl.
*H04L 41/5067* (2022.01)
*H04L 41/147* (2022.01)
(Continued)

(52) U.S. Cl.
CPC ........ *H04L 41/5067* (2013.01); *H04L 41/147* (2013.01); *H04L 41/16* (2013.01);
(Continued)

(58) Field of Classification Search
CPC ... H04L 41/5067; H04L 41/147; H04L 41/16; H04L 43/0864; H04L 43/087; H04L 43/0888; H04L 43/0894
See application file for complete search history.

(56) References Cited

U.S. PATENT DOCUMENTS

2006/0190594 A1  8/2006  Jorgenson et al.
2010/0315958 A1*  12/2010  Luo .................... H04L 43/00
                                                           370/248
(Continued)

FOREIGN PATENT DOCUMENTS

CN      101138200 A      3/2008
CN      107431638 A      12/2017
(Continued)

OTHER PUBLICATIONS

Trammell, B. et al., "The QUIC Latency Spin Bit", Internet-Draft Intended status: Experimental; Expires: Apr. 26, 2019, Oct. 23, 2018, pp. 1-7.
(Continued)

*Primary Examiner* — Nam T Tran
(74) *Attorney, Agent, or Firm* — COATS & BENNETT, PLLC (57) ABSTRACT

An apparatus in a mobile communication network combines information from monitoring IP flows carrying latency sensitive content passing the apparatus and information about the application behavior and target Quality of Experience (QoE) or target connectivity characteristics such as Quality of Service (QoS) from the application to provide ongoing predictions of QoE/QoS. In some cases, the apparatus
(Continued)

exploits a probe on a device to generate traffic for learning flow characteristics not obtained from monitoring application IP flows in the network. Embodiments disclosed herein can be used to predict quality metrics for many applications where jitter/latency is a factor affecting perceived quality, such as QoE for a human consumer or QoS for machine type communications. The embodiments are applicable to the analysis of traffic carrying conversational speech.

20 Claims, 6 Drawing Sheets

(51) Int. Cl.
  *H04L 41/16* (2022.01)
  *H04L 43/0864* (2022.01)
  *H04L 43/0888* (2022.01)
  *H04L 43/0894* (2022.01)
(52) U.S. Cl.
  CPC ...... *H04L 43/0864* (2013.01); *H04L 43/0888* (2013.01); *H04L 43/0894* (2013.01)

(56) References Cited

U.S. PATENT DOCUMENTS

| | | | | |
|---|---|---|---|---|
| 2015/0089046 | A1* | 3/2015 | Waxman | H04L 43/0888 709/224 |
| 2017/0373950 | A1 | 12/2017 | Szilagyi et al. | |
| 2019/0036808 | A1* | 1/2019 | Shenoy | H04L 41/5009 |
| 2019/0044705 | A1* | 2/2019 | Deval | H04L 9/088 |
| 2019/0222491 | A1* | 7/2019 | Tomkins | H04L 43/0829 |
| 2019/0238421 | A1* | 8/2019 | Kolar | H04L 41/147 |
| 2020/0112362 | A1* | 4/2020 | Roy | H04B 7/18528 |
| 2020/0288296 | A1* | 9/2020 | Fiorese | H04L 41/147 |

FOREIGN PATENT DOCUMENTS

| | | | |
|---|---|---|---|
| EP | 2163069 B1 * | 11/2010 | ........... H04L 43/087 |
| EP | 2163069 B1 | 11/2010 | |
| WO | 2008147255 A1 | 12/2008 | |

OTHER PUBLICATIONS

Trammell, B. et al., "Adding Explicit Passive Measurability of Two-Way Latency to the QUIC Transport Protocol", Internet-Draft Intended status: Informational; Expires: Nov. 15, 2018, May 14, 2018, pp. 1-24.
3rd Generation Partnership Project, "Technical Specification Group Services and System Aspects; Architecture enhancements for 5G System (5GS) to support network data analytics services (Release 16)", 3GPP TS 23.288 V1.0.0, May 2019, pp. 1-53.
Kt et al., "TS 23.288: Updating "Observed Service experience related network data analytics" to add QoS flow level network data from 5GC NF related to the QoS profile", SA WG2 Meeting #133, pp. 1-3, May 13-17, 2019, Reno, US, S2-1906152.
Bergkvist A. et al., "WebRTC 1.0 Real-time Communication Between Browsers", W3C Editor's Draft, May 30, 2019, pp. 1-229.
Schulzrinne, H. et al., "RTP: A Transport Protocol for Real-Time Applications", Network Working Group Request for Comments: 3550; Obsoletes: 1889; Category: Standard Tracks, Jul. 2003, pp. 1-104.
Iyengar, J., "QUIC Loss Detection and Congestion Control", pp. 1-40, retrieved on May 31, 2019, retrieved from internet https://github.com/quicwg/base-drafts/blob/master/draft-ietf-quic-recovery.md at master.
Alverstrand, H. et al., Identifiers for WebRTC's Statistics API, W3C Editor's Draft, May 20, 2019, pp. 1-63.

* cited by examiner

ESTIMATING QUALITY METRIC FOR LATENCY SENSITIVE TRAFFIC FLOWS IN COMMUNICATION NETWORKS

TECHNICAL FIELD

The present invention relates generally to network analysis and quality control, and in particular to an adaptive system for analyzing real-time network traffic to predict a quality metric in latency sensitive applications such as speech.

BACKGROUND

Support for real-time conversational voice has become an integral part of the Web. An important enabling technology is a protocol known as Web Real-Time Communications (WebRTC), which utilizes protocols such as Real Time Protocol (RTP) over User Datagram Protocol (UDP). QUIC (a protocol name, not an algorithm), is another developing protocol. WebRTC-enabled voice applications are used in both private and enterprise contexts.

5G systems are being designed to support high quality experience of tenant applications, such as Enterprise or private communication. Therefore, technical solutions for high quality voice experience are of interest, including how a WebRTC tenant application and a 5G system collaborate to achieve that end.

The mobile communication networks provide connectivity services to the WebRTC end points. The treatment of connectivity characteristic variations, such as jitter, packet loss and throughput, can be unique for the application provider. In addition, the WebRTC application uses end to end encryption, meaning that the mobile communication network is unaware of important meta data (such as codec/codec mode) needed to understand the voice quality. Further, the IP flow(s) carrying speech samples may be merged into a transport connection carrying many other flows, which may be unrelated to voice quality. This means the mobile communication network cannot deduce the voice quality with sufficient accuracy, and therefore may not take most appropriate action to achieve a desired level of quality, such as may be specified in a Service Level Agreement (SLA).

The application provider has insight into the quality of the voice, but cannot affect resource allocation in the mobile communication network unless there is a collaborative solution.

The mobile communication network cannot infer, with sufficient accuracy, the quality perceived by the end user, since a lot of network traffic information is missing by default. Examples of missing information include how packet jitter affect quality, how reduced throughput affect quality, how network latency affect quality, etc. Thus the network cannot take corrective actions, e.g., to fulfill SLA requirements/obligations. Furthermore, if the IP flows carrying speech samples are multiplexed into the same transport connection (e.g., using QUIC), then the mobile communication network has problems even identifying the particular IP flow.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, an apparatus in the mobile communication network combines information gleaned from monitoring IP flows carrying latency sensitive content passing the apparatus, and information about the application behavior and target Quality of Experience (QoOE) or target connectivity characteristics such as Quality of Service (QoS) from the application, to provide ongoing predictions of QOE/QoOS. As a preliminary step to estimating QoE/QoS, the apparatus may estimate late loss for an IP flow, which is the maximum allowed jitter before a receiver (such as a decoder) will consider a quanta of data (such as a speech frame) to be lost. In some cases, the apparatus exploits a probe on a device to generate traffic for learning flow characteristics not obtained from monitoring application IP flows in the network. Embodiments disclosed herein can advantageously be used to predict quality metrics for many applications where jitter/latency is a factor affecting perceived quality, such as QoE for a human consumer or QoS for machine type communications. One example of such an application is video in a video communication.

For the purposes of explanation herein, a specific example of latency sensitive content is voice. However, the embodiments of the invention are not limited to this example. In some specific embodiments, the network apparatus is designed to work for speech applications using QUIC as a transport protocol.

One embodiment relates to a method, in a mobile communication network, of estimating a quality metric for a packet flow associated with an application and carrying latency sensitive content. One or more algorithms are obtained for estimating a late loss and the quality metric for the packet flow. Iteratively, network traffic is monitored; packets belonging to the packet flow are classified; and network traffic parameters for the packets belonging to the packet flow are analyzed. Based on the obtained late loss algorithm, a late loss for the packet flow is predicted; and based on the obtained quality metric algorithm, a quality metric for the packet flow is predicted. The predicted quality metric is reported.

Another embodiment relates to a network node operative in a mobile communication network, and implementing an AccessGw operative to estimate a quality metric for a packet flow associated with an application and carrying latency sensitive content. The network node includes communication circuitry and processing circuitry operatively coupled to the communication circuitry. The processing circuitry is adapted to obtain one or more algorithms for estimating a late loss and the quality metric for the packet flow. The network node is then operative to iteratively monitor network traffic; classify packets belonging to the packet flow; and analyze network traffic parameters for the packets belonging to the packet flow. Based on the obtained late loss algorithm, the network node is operative to predict a late loss for the packet flow. Based on the obtained quality metric algorithm, the network node is operative to predict a quality metric for the packet flow. The network node is further operative to report the predicted quality metric.

Another embodiment relates to a computer program comprising instructions which, when executed on at least a processing circuitry of a node, cause the node to carry out steps of the method according to other embodiments.

Another embodiment relates to a computer readable storage medium comprising the computer program according to another embodiment.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. Although at least some of the embodiments herein may be described as applicable in certain contexts and/or wireless network types for illustrative purposes, the embodiments are similarly applicable in other contexts and/or wireless network types not explicitly described.

Figure 1:
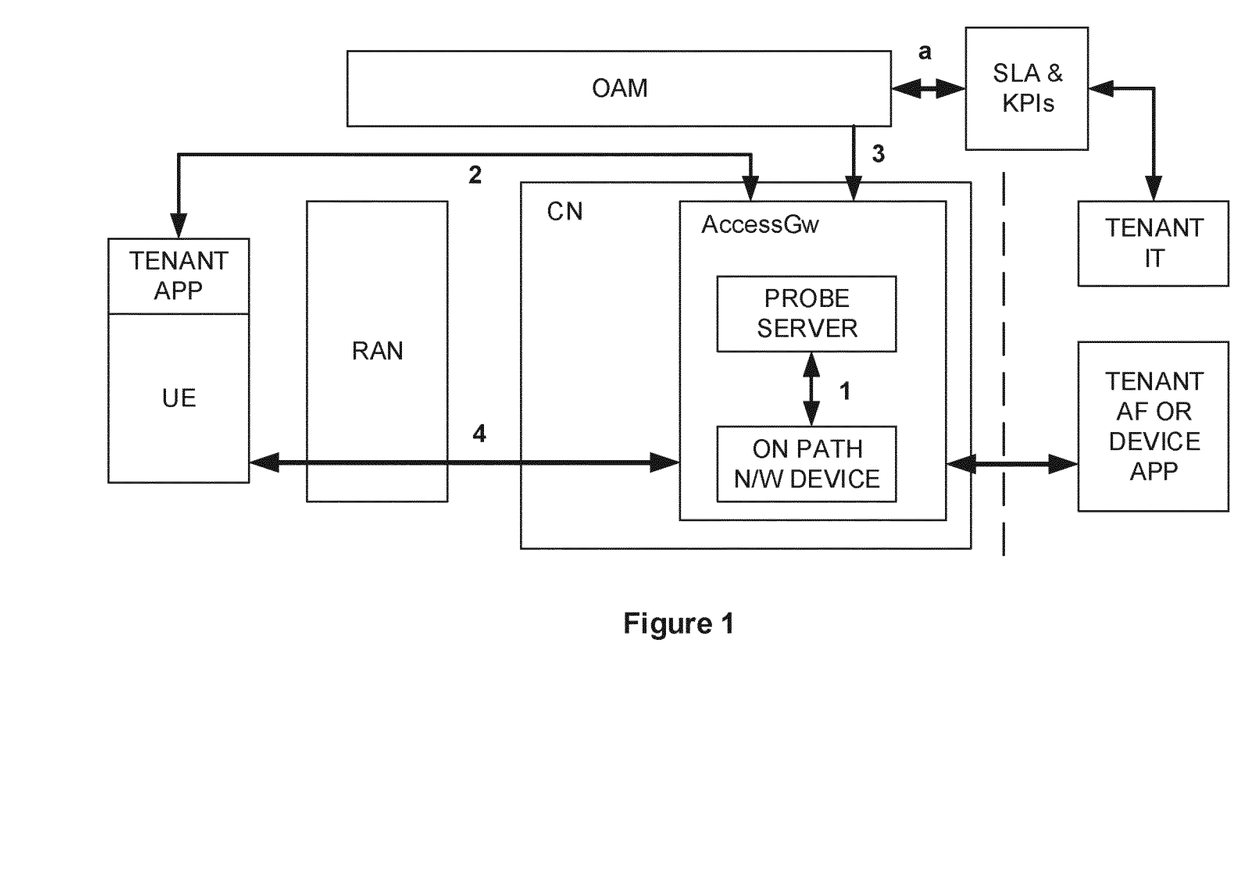
FIG. 1 is a block diagram of an AccessGw function in a mobile communication network.

FIG. 1 depicts an apparatus, referred to herein AccessGw, although of course it may be referred to by any name without affecting the scope of the present disclosure. AccessGw is a part of a mobile communication network. The AccessGw includes a part that is on-the-path between a device, such as a User Equipment (UE) connected to the mobile communication network, and the peer device or server. The AccessGw also includes a part that can communicate with the device, referred to as an application level probe server. The AccessGw monitors network traffic and predicts the QoE of speech sessions in real-time, outputting the result to different receivers.

The AccessGw receives information from the network OAM (Operation and Maintenance), via interface '3', in the mobile communication network. The information regards a tenant speech application, and includes at least a) a late loss detection function, or algorithm, that describes the maximum allowed jitter before a decoder will consider the speech frame(s) lost ("late loss"), and b) a Quality estimate function, or algorithm, that specifies the criteria for late loss statistics and characteristics during a specified duration that is allowed for a certain quality level for one session. Further information is usually included in the quality assessment part of the info provided over '3'. Such information includes how network latency, throughput, and the like map to quality levels. In addition, over '3' the tenant supplies IP flow identification information, such as source/destination IP/port. The IP flow identification information is used by the network to identify the IP flows carrying, e.g., speech.

Alternatively, where the AccessGw does not obtain late loss detection and QoE assessment algorithms over 'a', the AccessGw obtains feedback information from a device over interface '2', such as device measured late loss and/or quality as well as measured latency, throughput, packet loss etc. The AccessGW uses this data and combines it with other information, such as observations obtained using on-path network devices, to create data used to train late loss detection and QoE prediction algorithms.

As traffic passes through the AccessGw over path '4', it identifies the IP flows that are speech flows belonging to a specific tenant, monitors the traffic for jitter creating late loss, throughput, network latency, etc., and provides a stream of QoE estimates for the ongoing speech session. For this purpose, the AccessGw uses the late loss function and the Quality estimate function, which in one embodiment are obtained by machine learning.

The AccessGw observes only transport and network level information in the packets, along with the size signature of the payload the IP packets carry, to which it has access. This means unencrypted headers, and encrypted headers for which it has the security credentials necessary to decrypt. The unencrypted transport level information includes QUIC spin bit, which provides an estimate of the down-stream RTT, and the QUIC Connection ID and IP header information such as IP address and port. In case the AccessGw is seen as a trusted intermediate by the application, then it can be given access to a specific QUIC packet header encrypted with a secret shared between tenant and AccessGw.

An application provider and a mobile communication network provider enter an arrangement whereby the mobile communication network provider assures the quality of the mobile network services provided to delivery of the application data traffic, such as in this case, conversational speech. As part of the arrangement, the application provider, referred to herein as a tenant to the mobile communication network services, settles a service level agreement SLA) with the mobile communication network service provider, part of which includes information related to the speech, or conversational voice application.

The SLA includes information used by the mobile communication network to identify tenant speech IP flows, and means for facilitating the measurement of flow characteristics used to deduce the QoE of the speech, as further discussed herein.

A key part of the solution is the functions, or algorithms, used to detect late loss and to estimate QoE impact. These two functions can be provided by the tenant application, or learned by the mobile communication network based on feedback from the application of the late loss and quality as calculated by the application.

The OAM of the mobile communication network provides the speech part of the SLA to the AccessGW, along with an instruction, e.g., in form of a policy, to predict late loss and QoE for IP flows classified as belonging to the tenant. To accomplish this, the AccessGw may use QUIC packet characteristics and unencrypted header information, such as Connection ID, spin bit, and proprietary headers. It may also use encrypted headers for which it has been given the appropriate information to decrypt. Advantageously, this information allows the AccessGw to identify a stream inside a QUIC connection, and, continuously for a set of packets, by using a QoE estimate function provided in the SLA or learned using device feedback, output a stream of QoE estimates to various consumers inside and outside the mobile communication network. An example of usage inside the mobile communication network is adjustment of RAN resource (radio, compute and transport), scheduling of the observed or other streams in the same cell or beam, or Packet Core network shaping of other flows in the same cell or beam-performance assurance.

In one embodiment, the AccessGW predicts the QoE for a tenant speech, leveraging information visible outside an encryption envelope and packet size temporal signatures, such as inter arrival time and payload size variation, etc. In the case of QUIC, this also means unencrypted standard and proprietary headers, frames, and in particular the spin bit that is a reflection of the RTT as experienced in the application or transport layer of the device.

In another embodiment, the AccessGW includes a trusted QUIC proxy, which has been authoritatively included in the QUIC data stream by the Application provider, or tenant, in the WebRTC session establishment. This advantageously allows the AccessGw to access information in encrypted QUIC headers, to perform the same late loss and QoE predictions.

Figure 2:
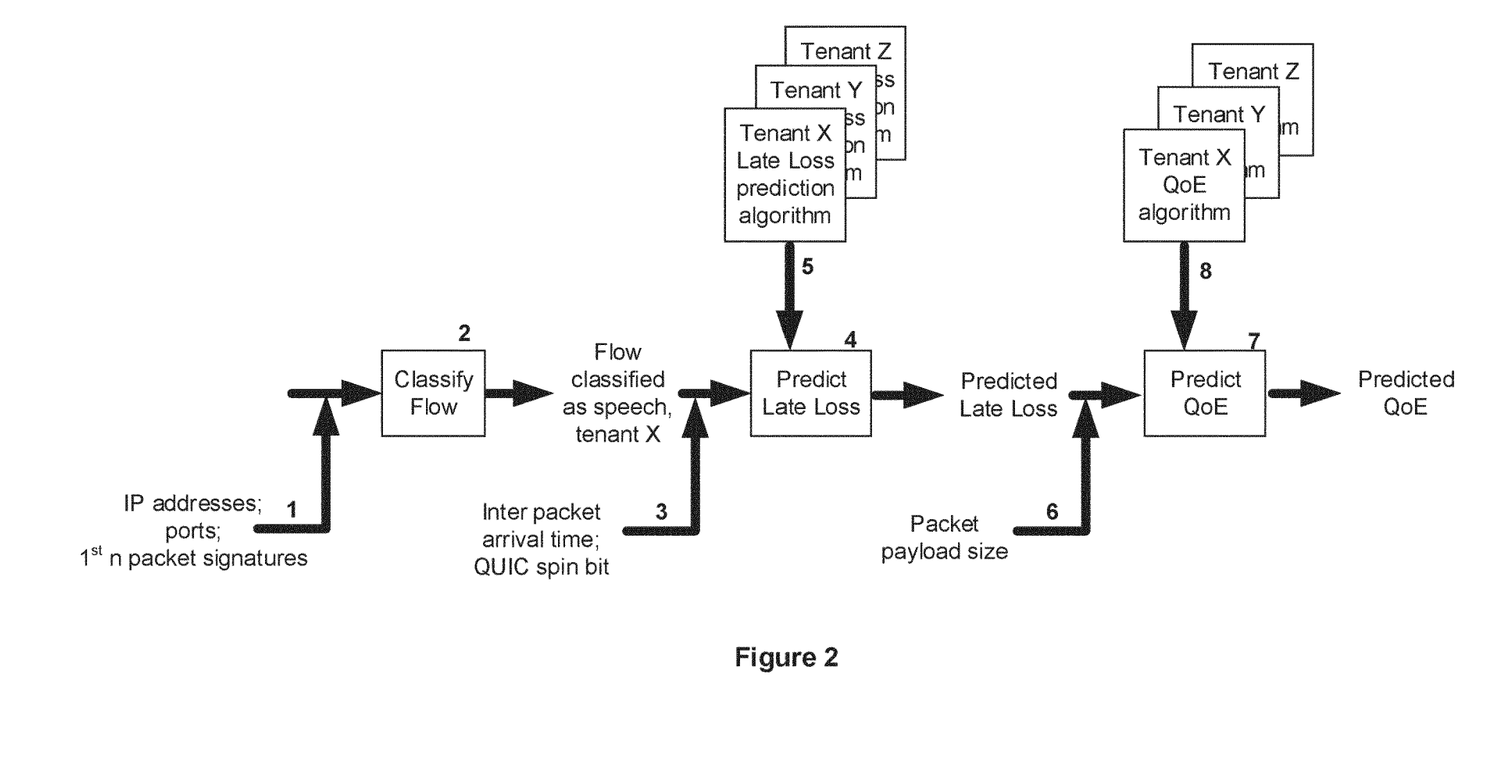
FIG. 2 is a flow diagram of a method of predicting QoE for a speech packet flow associated with a tenant application.

To this end- the online and real-time prediction of the speech session QoE- the AccessGW performs a number of steps. FIG. 2 depicts an example step-wise approach. Note that in an alternative embodiment, some steps can be collapsed into a multitask prediction.

0. Initially, the AccessGW is provided with algorithm for deducing late loss detection in the decoder and an algorithm, or function, for calculating QoE for speech for a session. The AccessGW is also provided with information enabling it to identify speech carrying IP flows.
1. IP packets arrive to the AccessGW.
2. A function in AccessGW classifies the flow using IP address, ports, and the size and arrival time signatures of the first n packets.
3. Flows classified as speech and belonging to a specific tenant are forwarded to the next function in the process.
4. A function predicting late loss monitors a speech flow associated with tenant X and, using inter-packet arrival time and QUIC spin bit information, predicts the possibility of late loss.
5. The process uses a late loss detection algorithm— provided by the tenant or learned by the AccessGW previously, using means described below—to predict late loss.
6. The information about the flow, late loss or not, and tenant, is provided to the next step in the process, together with throughput information, such as counting packet size, of the flow.
7. The QoE predicting process predicts a QoE based on the predicted late loss and packet payload size.
8. The QoE prediction uses the algorithm for tenant X speech to output QoE for a segment of the speech session.

This process is repeated throughout the speech session, to provide an ongoing, real-time, stream of QoE predictions.

Although in this description, the process is divided into certain discrete steps, those of skill in the art will recognize that in a given implementation, it may be beneficial to feed all available data (such as network latency, packet jitter, throughput, codec in use, etc.) into one model that estimates QoE. Furthermore, although presented using the specific example of speech content, those of skill in the art will readily recognize that the method is fully applicable to any latency-sensitive content, e.g., video, gaming, real-time MTC control systems, and the like.

In one embodiment, the AccessGw functionality is implemented in 5G Packet Core; in another embodiment it is implemented in 4G Packet Core. Some of the AccessGw internal functions can then be mapped to 3GPP network functions, which then require extensions.

Figure 3:
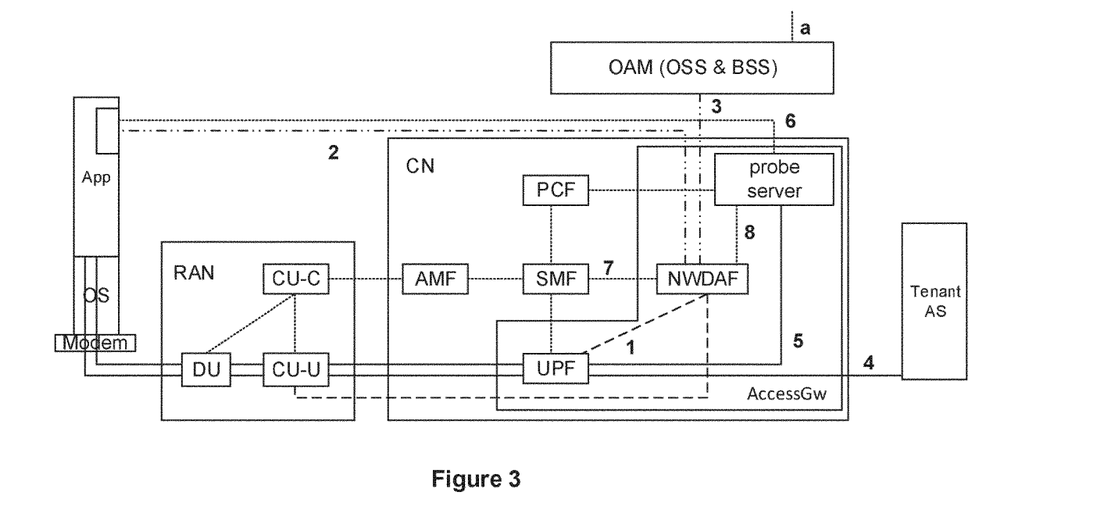
FIG. 3 is a block diagram of the AccessGw implemented in a 3GPP 5G mobile communication network.

Referring to FIG. 3, the AccessGw comprises the Network Data Analytics Function (NWDAF), The User Plane Function (UPF), and a probe server. The main entity is the NWDAF, which makes QoE estimates for the Web Real-Time Communication (WebRTC) speech connection that traverses the mobile communication network including UPF, RAN CU-U and DU.

In an embodiment where it trains the late loss and QoE machine learning models, the NWDAF uses device feedback via '2'—which may be coming directly from device (or via an application server, not shown) which includes the endpoint observed statistics such as late loss, throughput, RTT, packet loss, etc., as well as QoE. This data is combined with observations from UPF RAN, including but not limited to CU-U, into a training data set for the machine learning models used.

In case the QUIC spin bit is not enabled, the NWDAF may leverage a probe server to learn RTT between UE and UPF, as described below. The NWDAF guides the probe server in how it should perform. The probe server, typically implemented as a HTTP Web application, works together with a device-side application logic to create a suitable traffic pattern that will enable the NWDAF to infer the transport characteristics. As further described below, this approach is referred to as side-car traffic analysis.

NWDAF may receive relevant metadata about the traffic, such as codec in use and other configurations via '3' as well as, optionally, a quality function as an alternative to training a model for using combined information from '2', '1' and '4'.

The NWDAF can also use information from RAN CU and CU-U about IP flow characteristics, complementing UPF. This information is either made available to NWDAF via '4' or via UPF, UPF getting the information from RAN and embeds it in its reports to NWDAF via '1'

Figure 4:
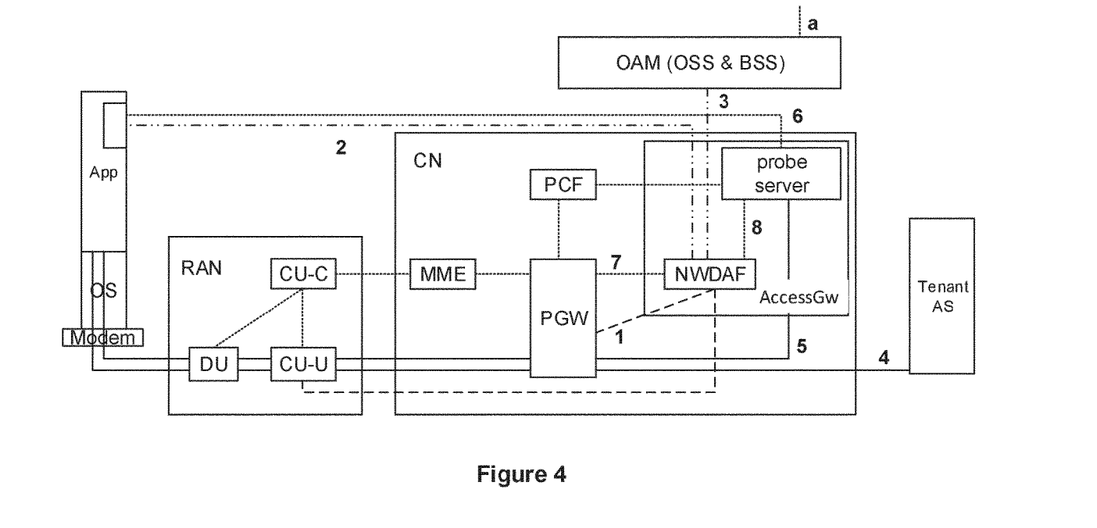
FIG. 4 is a block diagram of the AccessGw implemented in a 3GPP 4G mobile communication network.

A 4G Packet Core embodiment is depicted in FIG. 4, in which the AccessGw comprises the NWDAF and a probe server, as described above.

The spin bit is an innovation in the QUIC protocol that allows for simple and efficient RTT determination. According to the specification: "The spin value is determined at each endpoint within a single connection according to the following procedure:

When the server receives a packet from the client, if that packet has a short header and if it increments the highest packet number seen by the server from the client, the server sets the spin value to the value observed in the spin bit in the received packet.

When the client receives a packet from the server, if the packet has a short header and if it increments the highest packet number seen by the client from the server, it sets the spin value to the opposite of the spin bit in the received packet.

This procedure will cause the spin bit to change value in each direction once per round trip. Observation points can estimate the network latency by observing these changes in the latency spin bit."

See the following links for information regarding the spin bit specification and operation:

"QUIC Loss Detection and Congestion Control", https://github.com/quicwg/base-drafts/blob/master/draft-ietf-quic-recovery.md "Adding Explicit Passive Measurability of Two-Way Latency to the QUIC Transport Protocol" https://tools.ietf.org/html/draft-trammell-quic-spin-03

"The QUIC Latency Spin Bit" https://quicwg.org/base-drafts/draft-ietf-quic-spin-exp.html The spin bit gives a proper network delay measurement if the sender is not application or flow control limited. In case of speech traffic, the speech sender is often not application or flow control limited.

In cases where this does occur, the AccessGw can learn to filter out such effect by observing streams from known senders which do not have application layer flow control limitations, for instance by running a test client to a AccessGw probe server, in which case application level and flow control sender limitation is known.

In another embodiment, the AccessGw leverages the ACK message which is returned by the transport layer in the client as a response on downlink traffic. The AccessGw cannot read the encrypted header, and thus read it to recognize an ACK message. However, it can be identified using packet pattern identification, for example leveraging information of default QUIC ACK server response time, the default value of which is 25 ms.

As an alternative to using QUIC to measure RTTs, in one embodiment the AccessGw leverages ICMP ping to make delay measurements.

Figure 5:
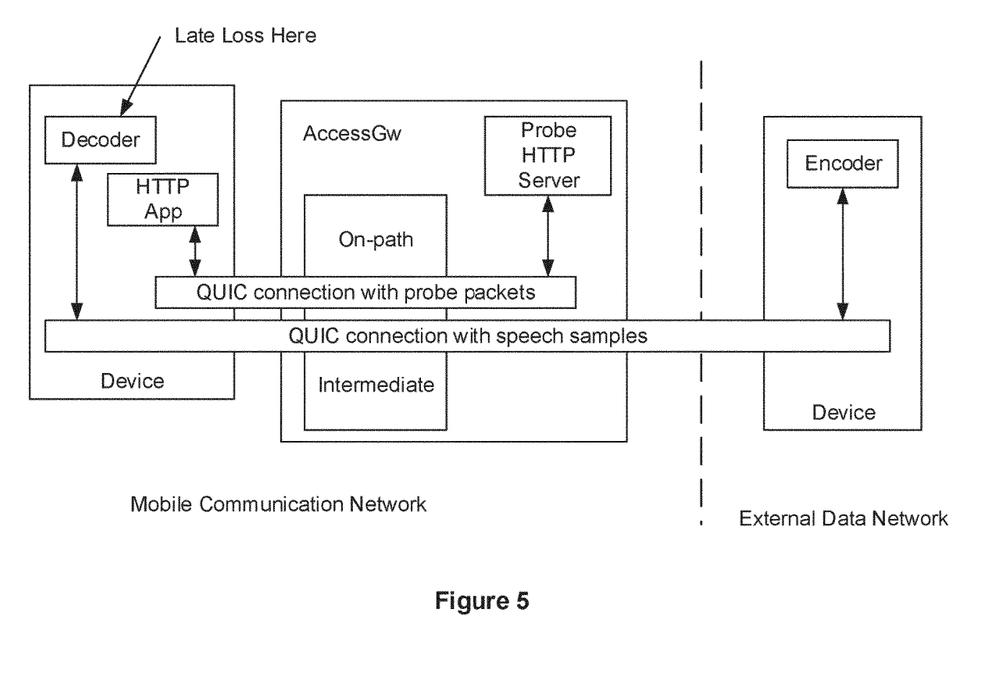
FIG. 5 is a block diagram of a method of side car network traffic analysis.

In case the QUIC spin bit is not enabled by the tenant QUIC server endpoint, in one embodiment the AccessGW may resort to ICMP, as described above. In another embodiment, a device onboard probe generates IP traffic to the probe server, as depicted in FIG. 5. This enables QUIC spin bit on the connection between the device and tenant server, with the AccessGw on the path. This provides the AccessGw with the means for doing RTT estimates, leveraging also its control of the probe traffic to generate traffic of a suitable flow characteristics profile. The probe server can also measure packet loss and reordering, examples of impairments that require visibility of packet sequence numbers to determine. The information obtained is used to develop, program, or train, an algorithm that estimates the transport characteristics on the path. This QUIC connection is not the same as the QUIC connection carrying application traffic, but shares part of the same links, running 'side-by-side'. Accordingly, this technique is referred to herein as 'side car' network traffic analysis. The system can learn to estimate the difference between a true QUIC probe and a side car probe by observing the two results in devices where both are available and use the observations in the algorithm development/training.

Figure 6:
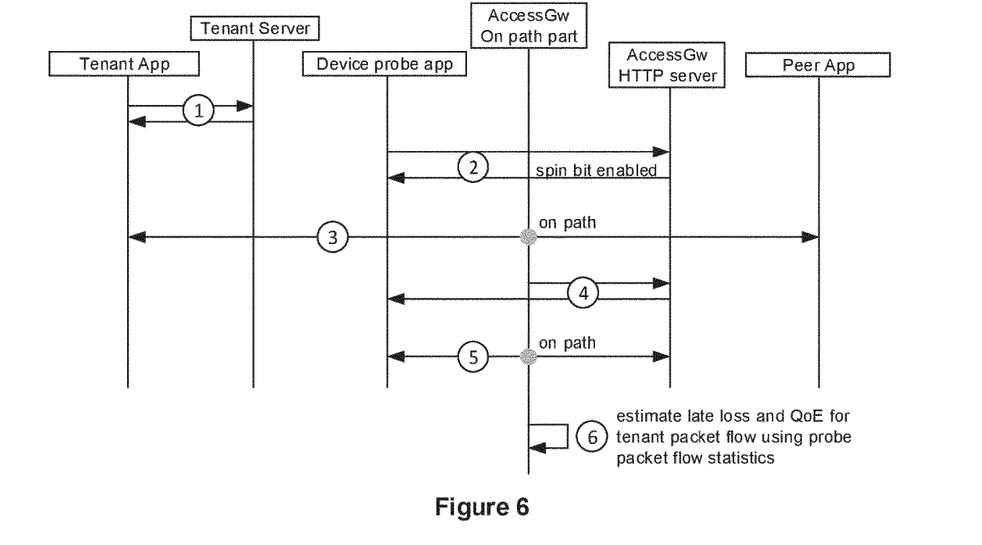
FIG. 6 is a signaling diagram of the method of FIG. 5.

FIG. 6 depicts a representative signaling diagram showing one sequence for invoking the side car probe.

1. First, a tenant application, which generates latency sensitive content, such as voice, connects with its application servers.

2. The probe client ("HTTP app" in FIG. 5) is activated and connects with probe server in the AccessGw. The probe server configures the connection to include the QUIC spin bit.

3. A latency sensitive (e.g., speech) session is initiated, including QUIC connection for transport of the packet flow. The spin bit may or may not be enabled.

4. The AccessGW detects the latency sensitive (e.g., speech) IP flow connection and infers need for complementary measurement. Accordingly, it triggers the probe server to trigger probe traffic (to the application on the device) as instructed.

5. The probe client generates traffic to the probe server, according to instructions.

6. Using the probe QUIC spin bit, the AccessGw estimates late loss for the latency sensitive traffic, and uses this to predict QoE for the session, in real time as the session is running. Packet loss and reordering measurements gathered in probe server (which require visibility, such as packet numbers) can enable additional impairment indications for the tenant user traffic.

As mentioned above, the AccessGw can include a QUIC proxy that has access to all or parts of the encrypted QUIC header frames, standardized or proprietary, enabling it to identify a specific stream on a QUIC connection where multiple streams are present. It also enables the proxy to measure packet loss and amount of reordering. This is done by sharing of secrets between tenant and application provider allowing the AccessGW to read, not necessarily change, selected headers/frames. This mechanism can also be used to expose QUIC ACKs to the AccessGw, allowing it to adjust for receiver delays. Other important information includes packet numbers, to allow the AccessGw to learn to detect packet loss and reordering. The means for exchanging encryption information between tenant and mobile communication network operator is well within the skill of one of ordinary skill in the art, and is not further described herein.

The functions, or algorithms, for deducing the QoE of the speech can either be provided by the tenant to the mobile communication network provider or be learned by the mobile communication network, or more specifically the AccessGw. In one embodiment, the training is done in the actual network—referred to as "online", in contrast to being done in a lab, which is referred to as "offline". The online learning method leverages device components, preferably embedded in the tenant application, that use transport as well as post-decoder statistics, e.g., as described in WebRTC, to provide reports to the probe server on transport as well as post-decoder characteristics, estimated (by tenant) speech quality and, optionally, user explicit or implicit feedback.

This information is used together with data collected about the IP flow characteristics modules, UPF and CU-U in 3GPP, to create a training data series for this session for this device and similarly for other devices, for training an algorithm to learn a) a late loss detection algorithm and b) the tenant speech QoE estimate specific algorithm (if not provisioned via 'a' interface).

The specification for WebRTC statistics defines a very rich set of statistics. The first version of the WebRTC API, WebRTC 1.0 defines that a subset of the statistics is mandatory to implement. However, the mandatory to implement subset is rich enough to enable sufficient QoE deduction.

Notably, the RTCReceivedRtpStreamStats API includes (all mandatory for WebRTC 1.0):

packetsReceived: Total number of RTP packets received for this SSRC. At the receiving endpoint, this is calculated as defined in [RFC3550] section 6.4.1.

packetsLost: Total number of RTP packets received for this SSRC. At the receiving endpoint, this is calculated as defined in [RFC3550] section 6.4.1.

jitter: Packet Jitter measured in seconds for this SSRC. Calculated as defined in section 6.4.1. of [RFC3550].

packetsDiscarded: The cumulative number of RTP packets discarded by the jitter buffer due to late or early-arrival, i.e., these packets are not played out.

actions. The identifiers defined (and proposed) include jitterBufferDepth, playoutTimestamp, acceleration/deceleration events in jitter buffer, number of concealed (audio) samples, how many of the concealed samples that were replaced by silence, number of concealment events, etc. Such information will be able to aid in creating an even more accurate QoE estimation.

For an example on how to access WebRTC stats, see below.

```
1     const receiver = pc.getReceivers( )[0]; //assuming this is the receiver
2                    // we're interested in
3     
4     function getAndSendStats( ) {
5     | receiver.getStats( ).then((report => {
6     | | for (let stats of report.values( )) {
7     | | | if (stats.type != "inbound-rtp")
8     | | | | continue;
9     | | | const timestamp = stats.timestamp;
10    | | | const totalLossRate = (stats.packetsLost + stats.packetsDiscarded) /
11                             (stats.packetsReceived + stats.packetsLost + stats.packetsDiscarded);
12    | | | const linkLossRate = (stats.packetsLost) /
13                             (stats.packetsReceived + stats.packetsLost + stats.packetsDiscarded);
14                             // get the corresponding stats from the baseline report
15    | | | const lateLossRate = (stats.packetsDiscarded) /
16                             (stats.packetsReceived + stats.packetsLost + stats.packetsDiscarded);
17    | | | const jitter = stats.jitter;
18    | | | const trackId = stats.trackId;
19    | | | const receiverId = stats.receiverId;
20    | | | const remoteReceiverId = stats.remoteReceiverId;
21    | | | const lastPacketReceivedTimestamp = stats.lastPacketReceivedTimestamp;
22    | | | const bytesReceived = stats.bytesReceived;
23    | | | const perDscpPacketsReceived = stats.perDscpPacketsReceived;
24    | | | const codecs = receiver.getParameters( ).codecs;
25    | | |
26    | | |const statsJSON = { timestamp, totalLossRate, linkLossRate, lateLossRate, jitter, trackId,
27                             receiverId, remoteReceiverId, lastPacketReceivedTimestamp, bytesReceived,
28                             perDscpPacketsReceived, codecs };
29    | | | |
30    | | | fetch(urlToStatsServer, {
31    | | | | method: 'POST',
32    | | | | body: JSON.stringify(statsJSON)
33    | | | }).then{res => {
34    | | | | if (res.ok) {
35    | | | | | console.log('Stats upload successful');
36    | | | | } else {
37    | | | | |console.log('Stats upload failed');
38    | | | | }
39    | | | | setTimeout(getAndSendStats, 10000); // wait 10 secs, then get and send new stats
40    | | | }).catch(err => {
41    | | | | console.log('Stats post failed, reason: ${err}');
42    | | | });
43    | | }
44    | }).catch(err => {
45    | | } console.log{'Getting receiver stats failed for reason ${err}, giving up');
46    | });
47    }
48    
49    getAndSendStats( );
```

Combining the above with ptime and encodings of RTCRtpSendParameters (WebRTC 1.0) will give a good picture of frames lost due to late arrival.

Further, other (mandatory to implement) stats of interest include:

roundTripTime (from RTCRemoteInboundRTPStreamStats)

packetsSent, bytesSent, bytesReceived, roundTripTime (various APIs)

payloadType, codec (RTCCodecStats)

Figure 7:
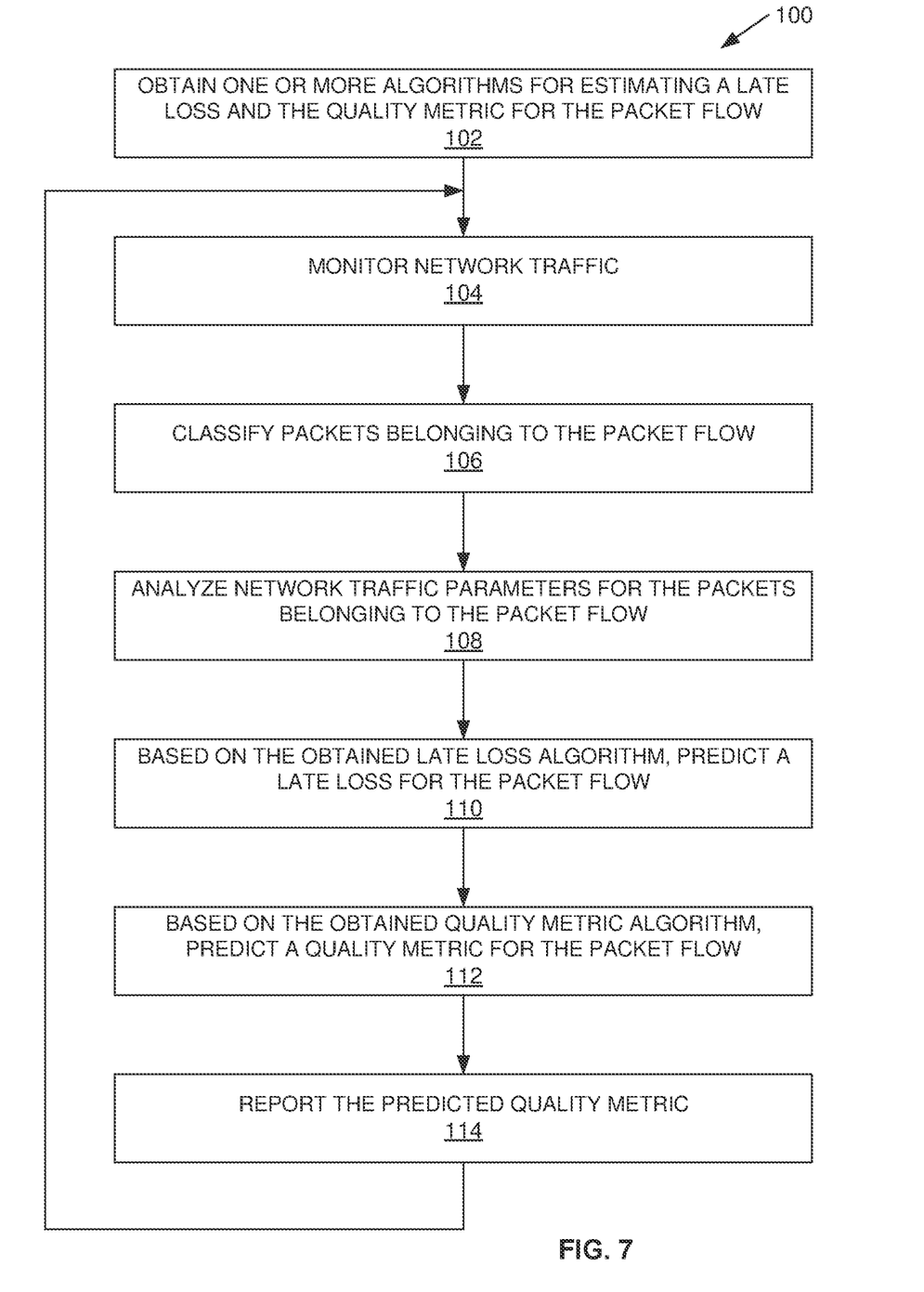
FIG. 7 is a flow diagram of a method of estimating a quality metric for a packet flow associated with an application and carrying latency sensitive content.

Note that the above is based on the bare minimum (mandatory to implement), based on discussions in the community. There is a lot of interest in exposing further information related to the jitter buffer and error concealment FIG. 7 depicts the steps in a method 100, performed in a mobile communication network, of estimating a quality metric for a packet flow associated with an application and carrying latency sensitive content. One or more algorithms are obtained for estimating a late loss and the quality metric for the packet flow (block 102). Numerous steps are then performed iteratively. Network traffic is monitored (block 104). Packets belonging to the packet flow are classified (block 106). Network traffic parameters for the packets belonging to the packet flow are analyzed (block 108). Based on the obtained late loss algorithm, a late loss for the packet flow is predicted (block 110). Based on the obtained quality metric algorithm, a quality metric for the packet flow is predicted (block 112). The predicted quality metric is then reported (block 114), and the monitoring, classifying, analysis, and two prediction steps are repeated.

Figure 8:
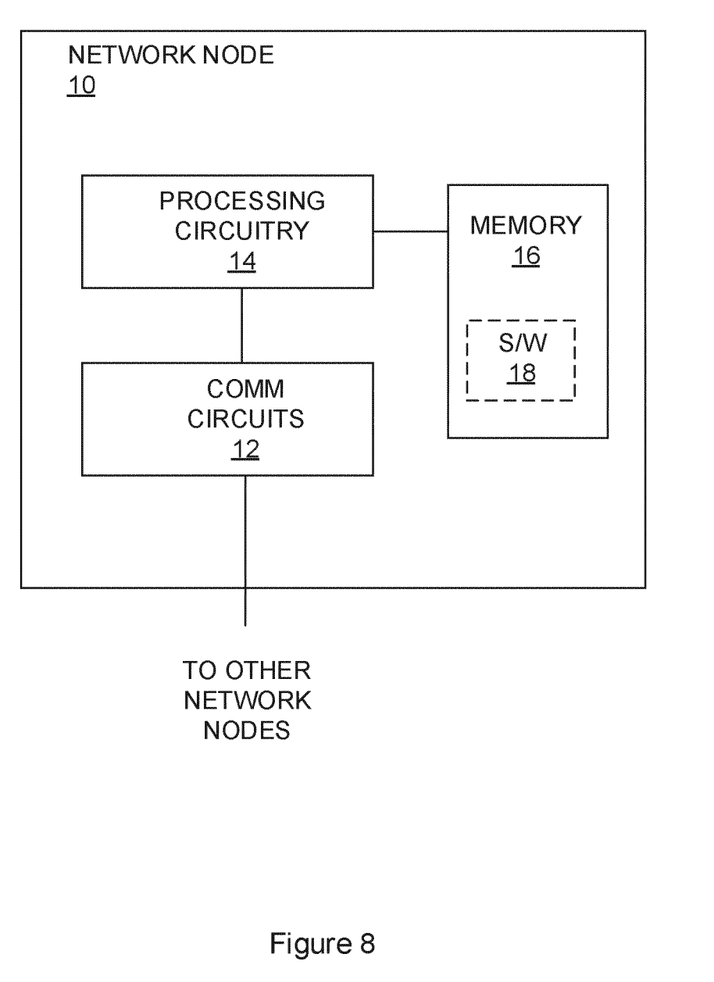
FIG. 8 is a block diagram of a mobile communication network node suitable for implementing the AccessGw described herein.

FIG. 8 depicts a network node 10 operative in a mobile communication network, which may implement an AccessGw as described herein. The network node 10 includes communication circuits 12 operative to exchange data with other network nodes; processing circuitry 14; and memory 16. In various embodiments, the network node may include additional features, such as radio circuits to effect wireless communication across an air interface to one or more mobile devices. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to embodiments of the present invention, the memory 16 is operative to store, and the processing circuitry 14 is operative to execute, software 18 which when executed is operative to cause the network node 10 to classify and analyze latency-sensitive packet flows without conventional traffic analysis information being available, and to predict late loss and QoE of such flows, as described and claimed herein.

The processing circuitry 14 may comprise any sequential state machine operative to execute machine instructions stored as machine-readable computer programs 18 in memory 16, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 16 may comprise any machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. In some embodiments, the software 18 may be retrieved by the processing circuitry 14 from a carrier which may comprise an electronic signal, optical signal, or radio signal, in addition to, or in lieu of, a computer readable storage medium such as memory 16.

The communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Those skilled in the art will also appreciate that embodiments herein further include corresponding computer programs. A computer program comprises instructions which, when executed on at least processing circuitry 14 of a node 10, cause the node 10 to carry out any of the processing described herein, such as the method 100. A computer program in this regard may comprise one or more code modules. Embodiments of the present invention further include a carrier containing such a computer program. This carrier may comprise one of an electronic signal, optical signal, radio signal, or computer readable storage medium 16.

Embodiments of the present invention present numerous advantages over the prior art. They provide a mechanism that enables the mobile communication network to predict, in real time, the voice quality for an ongoing voice conversation, without breaking the encryption and with a minimal amount of information exchange between the tenant and mobile communication network provider. The tools for monitoring the speech quality are under the control of the mobile communication network operator, thus decreasing the risk of fraudulent behavior. In embodiments where the application does not provide the necessary algorithms, the AccessGw may deduce them through machine learning based on actual network traffic and late loss and QoE assessment by the application. In embodiments where network traffic information necessary to train machine learning functions for these algorithms is not available (or visible), a "side car" traffic exchange may be established, and statistics for the actual network traffic estimated based on the side car traffic.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, in a mobile communication network, of estimating a quality metric for a packet flow associated with an application and carrying latency sensitive content, the method characterized by:
    obtaining one or more algorithms for estimating a late loss and the quality metric for the packet flow associated with the application; and
    monitoring network traffic;
    classifying packets as belonging to the packet flow associated with the application;
    analyzing network traffic parameters for the packets belonging to the packet flow associated with the application;
    based on the obtained late loss algorithm, predicting a late loss for the packet flow associated with the application, the late loss being a maximum allowed jitter before a receiver will consider a quanta of data to be lost;
    based on the obtained quality metric algorithm and the predicted late loss, predicting a quality metric for the packet flow associated with the application; and
    reporting the predicted quality metric.

2. A network node operative in a mobile communication network, and implementing an access gateway(AccessGw) operative to estimate a quality metric for a packet flow associated with an application and carrying latency sensitive content, the network node characterized by:
    communication circuitry; and
    processing circuitry operatively coupled to the communication circuitry and adapted to:
        obtain one or more algorithms for estimating a late loss and the quality metric for the packet flow associated with the application; and
        monitor network traffic;
        classify packets as belonging to the packet flow associated with the application;

analyze network traffic parameters for the packets belonging to the packet flow associated with the application;

based on the obtained late loss algorithm, predict a late loss for the packet flow associated with the application, the late loss being a maximum allowed jitter before a receiver will consider a quanta of data to be lost;

based on the obtained quality metric algorithm and the predicted late loss, predict a quality metric for the packet flow associated with the application; and report the predicted quality metric.

3. The network node of claim 2 wherein the latency sensitive content is voice, and wherein the quality metric is a Quality of Experience (QoE).

4. The network node of claim 2 wherein the processing circuitry is further operative to perform the monitoring, classifying, analyzing, predicting a late loss, predicting a quality metric, and reporting steps iteratively over two or more of a plurality of monitoring periods.

5. The network node of claim 2 wherein the processing circuitry is operative to obtain one or more algorithms for estimating late loss and quality metric for the packet flow by obtaining the algorithms from an Operations and Maintenance (OAM) function in the mobile network.

6. The network node of claim 5 wherein the processing circuitry is operative to obtain the algorithms from an OAM function in the mobile network by obtaining the algorithms from the application as part of a Service Level Agreement (SLA) between the application and the network.

7. The network node of claim 6 wherein the late loss algorithm describes the maximum allowed jitter before a decoder will consider a data frame lost.

8. The network node of claim 6 wherein the quality metric algorithm specifies the criteria for late loss statistics and characteristics that is allowed during a specified duration to maintain a determined quality level for one session.

9. The network node of claim 8 wherein the quality metric algorithm further specifies one or more mappings between quality levels and network latency or throughput.

10. The network node of claim 8 wherein the processing circuitry is further characterized by being adapted to obtain from the application packet flow information that facilitates the identification of packet flows carrying latency sensitive content.

11. The network node of claim 2 wherein the processing circuitry is adapted to obtain one or more algorithms for estimating late loss and quality metric for the packet flow by training one or more machine learning functions based on network traffic metrics including measured latency, throughput, and packet loss.

12. The network node of claim 11 wherein the training is based on feedback from the application of the late loss and quality metric as calculated by the application.

13. The network node of claim 12 wherein the packet flow comprises a QUIC transport protocol connection, and wherein training of a machine learning function for the late loss estimating algorithm is based on QUIC packet characteristics and unencrypted header information, including one or more of QUIC Connection ID, spin bit, and IP header information.

14. The network node of claim 12 wherein the application has provided decryption information, and wherein training of the machine learning function for the late loss estimating algorithm is further based on information in encrypted headers.

15. The network node of claim 14 wherein the processing circuitry is further characterized by being adapted to execute a trusted QUIC proxy operative to at least read encrypted QUIC header information in the packet flow, based on the received decryption information.

16. The network node of claim 2 wherein the network node comprises a Network Data Analytics Function (NWDAF) and wherein the packet flow is generated by a Web Real-Time Communication (WebRTC) speech connection traversing the mobile network.

17. The network node of claim 16 wherein the NWDAF receives, from a device in the WebRTC connection, end point observed statistics including one or more of late loss, throughput, Round Trip Time (RTT) packet loss, and quality metric.

18. The network node of claim 2 wherein the processing circuitry is adapted to analyze network traffic parameters for the packets belonging to the packet flow by, where one or more desired network traffic parameters are not available or visible in the packet flow:

establishing side car network traffic between a probe server and a probe application on a device, the side car network traffic sharing at least part of the packet flow's path through the mobile network;

monitoring network traffic parameters exposed in the side car network traffic that are not available or visible in the packet flow; and analyzing network traffic parameters for the packets belonging to the packet flow by analogy to the network traffic parameters in the side car network traffic.

19. The network node of claim 18 wherein network traffic parameters exposed in the side car network traffic that are not available or visible in the packet flow include a QUIC spin bit, enabling analysis of downstream Round Trip Timing (RTT).

20. The network node of claim 18 wherein network traffic parameters exposed in the side car network traffic that are not available or visible in the packet flow include packet sequence, enabling analysis of packet loss and reordering.

* * * * *